United States Patent

[11] 3,616,375

| [72] | Inventor | Kiyoshi Inoue<br>100 Sakato Kawasaki, Kanagawa, Tokyo, Japan |
|---|---|---|
| [21] | Appl. No. | 613,791 |
| [22] | Filed | Feb. 3, 1967 |
| [45] | Patented | Oct. 26, 1971 |
| [32] | Priority | Mar. 3, 1966 |
| [33] | | Japan |
| [31] | | 41/12963 |

[54] METHOD EMPLOYING WAVE ENERGY FOR THE EXTRACTION OF SULFUR FROM PETROLEUM AND THE LIKE
14 Claims, 13 Drawing Figs.

[52] U.S. Cl. .................................................. 204/162 R, 204/162 S, 204/168
[51] Int. Cl. ..................................................... B01j 1/10, B01j 1/12
[50] Field of Search ......................................... 204/162, 162 AE, 162 S, 168, 193

[56] References Cited
UNITED STATES PATENTS

| 1,897,617 | 2/1933 | Mekler | 204/162 |
| 2,578,377 | 12/1951 | Smith | 204/162 (S) X |
| 2,763,593 | 9/1956 | Leesemann | 204/162 X |
| 3,055,818 | 9/1962 | McArthur et al. | 204/162 HE |

Primary Examiner—Benjamin R. Padgett
Attorney—Karl F. Ross

ABSTRACT: A method of decreasing the sulfur content of crude oil and other petroleum products in which the sulfur is present in an elemental state or in chemical combination with an organic substance (i.e., the crude oil), in which high-energy activation at relatively low temperatures ruptures carbon-sulfur bonds of the molecules and effectively forms hydrogen-sulfur bonds in the form of $H_2S$ or carbon-sulfur bonds as $CS_2$, etc. so that gaseous sulfur-containing compounds are evolved from the liquid. The periodic high energy can be an impulsive spark discharge alone or accompanied by vibrational shock of sonic or ultrasonic frequency; laser activation with or without sonic waves of a frequency facilitating the rupture of the bonds to produce gaseous sulfur-containing compounds is also suitable. The apparatus includes an activation chamber through which the crude oil is pumped while being transported aboard a tanker or the like, means for recovering or discharging the gases, and one or more sulfur-removing devices such as a spark-discharge electrode assembly, cavitation generator, ultrasonic or sonic transducer, shock wave generator, high frequency electrode assembly, laser or microwave generator.

PULSE DURATION

TREATMENT TIME

KIYOSHI INOUE
INVENTOR

BY Karl F. Ross
Attorney

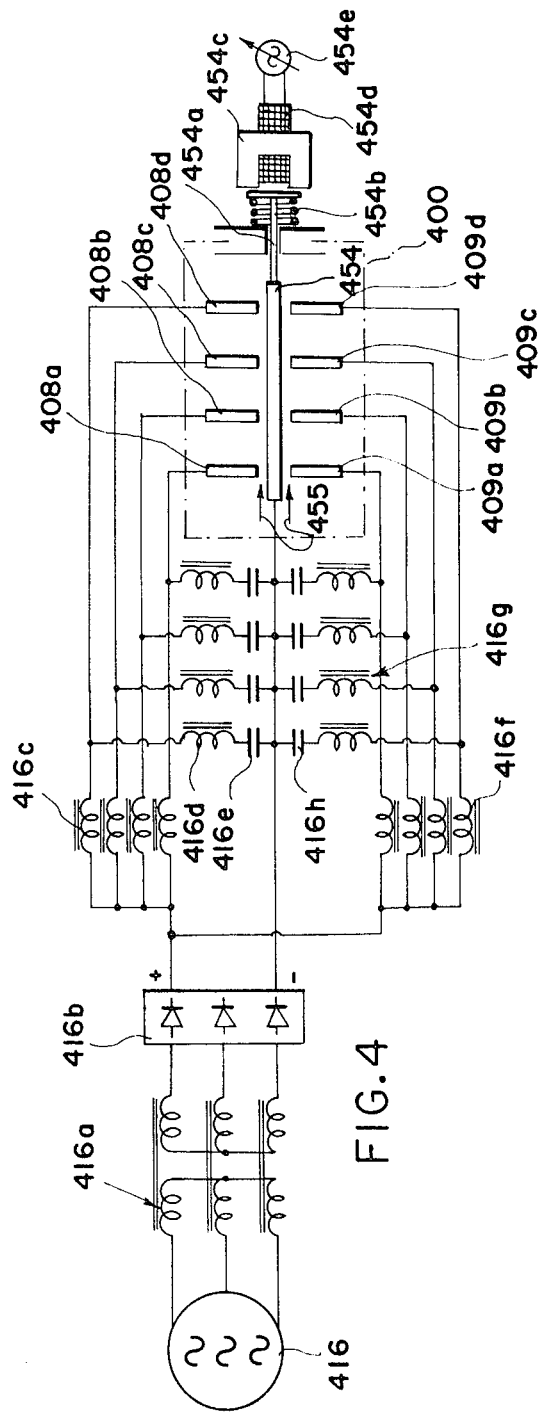
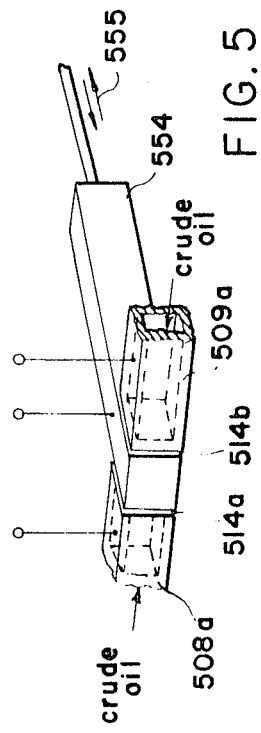

METHOD EMPLOYING WAVE ENERGY FOR THE EXTRACTION OF SULFUR FROM PETROLEUM AND THE LIKE

The present invention relates to a method of and apparatus for the extraction of sulfur from petroleum and the like and, more particularly, to the diminution of the sulfur content in organic liquids in which the sulfur is present in an elemental state, as a sulfur bridge between organic molecules or in simpler chemical combinations (e.g., as mercaptans).

The presence of sulfur in chemically combined or elemental form in crude oil and other liquid petroleum products has posed significant problems in terms of air pollution and detriment to health. Frequently, the economics of industrial plants, power plants, heating installations and the like require fuel oils of relatively low grade and subject it to minimum refining. When the crude oil from which the fuel is derived contains a large proportion of sulfur, it is found that combustion of the fuel releases into the atmosphere noxious gases including hydrogen sulfide ($H_2S$), sulfur dioxide ($SO_2$) and sulfur trioxide ($SO_3$). The sulfur oxides are among the most dangerous components of air pollution with respect to the health of the populace and are detrimental in a technological sense as well, inasmuch as they are anhydrides of sulfurous and sulfuric acids and may form corrosive acids by combination with ambient moisture.

While many systems have been proposed heretofore for the reduction of the sulfur content of fuel oils and crude oils, these systems have proved uneconomical for the most part. Thus, mere vacuum treatment of crude oils is ineffective for significantly reducing the proportion of sulfur in the organic liquid, while thermal treatments are expensive and may, if carried out extensively, severely modify the composition of the oil. As a practical matter it has not heretofore been economically feasible to treat crude oils, fuel oils and like organic sulfur-containing liquids, economically, efficiently, in large volume and at low cost.

It is, therefore, the principal object of the present invention to provide a system for reducing the sulfur content of organic liquids and, especially of crude oils and petroleum products whereby the aforementioned disadvantages can be avoided and desulfurization effected economically and efficiently.

Another object of this invention is to provide an improved method for the desulfurization of petroleum liquids which may be carried out conveniently without substantial capital expenditure, is effective to reduce the sulfur content to surprisingly low levels, and is relatively simple and convenient.

Still another object of my invention is to provide an improved apparatus for the desulfurization of crude oils and the like.

These objects and others which will become apparent hereinafter are attained, in accordance with the present invention, by a system for the desulfurization of crude oil and other petroleum liquids containing sulfur in a free or chemically combined state, which is based upon my surprising discovery that certain high-energy (radiant or vibrational) sources may be used to treat the sulfur-containing liquid without substantial heating thereof, but yet are capable of rupturing and reforming chemical bonds involving the sulfur so that a substantial proportion of the sulfur is reformed into compounds such as hydrogen sulfide, carbon disulfide, etc., which are gaseous at ambient temperatures and are readily evolved from the liquid.

While I do not wish to be bound by any theory in this regard, it appears that several free-radical-type reactions may be involved and that the release of sulfur from organic compounds to which it is chemically bound preferentially results in the formation of the gaseous components mentioned above. Thus it is conceivable that compounds having carbon-sulfur bonds may be broken between the carbon and sulfur to form an active or activated sulfur atom which, because of its proximity to large numbers of hydrogen atoms (some of which may be released from the organic molecule by the high-energy activation field), forms with these hydrogen atoms or with hydrogen atoms stripped by the sulfur from the molecule, highly volatile hydrogen sulfide. The latter is only limitedly soluble in the liquid and thus emerges therefrom in the form of gas bubbles. Similarly, the sulfur atom may attack a carbon atom in the organic chain to eventually produce carbon disulfide. Another possible mechanism for the formation of this volatile sulfur-containing compound is the rupture, at the high energy referred to, of a carbon-carbon bond adjacent a carbon-sulfur bond. In this case, an activated CS* species may release a further sulfur atom in a chemically bound state or combined with a free sulfur atom to form carbon disulfide.

According to a further feature of this invention, the partial pressure of the volatile sulfur-containing compounds above a free surface of the liquid treated is reduced by flushing this surface with a gas stream free from the sulfur-containing gases, hydrogen sulfide and carbon disulfide or by evacuating the space above the free liquid surface to draw the evolved gases therefrom.

According to one aspect of this invention, the high-energy activation of the sulfur-containing crude oil is effected by an impulsive electric discharge across a pair of electrodes between which the liquid flows. The electrodes may, moreover, be composed of substances which catalyze the desulfurization act and I have found, for example, that electrodes composed of alloys containing tungsten, molybdenum, vanadium, titanium, chromium, cadmium and zinc, alone or in combination, have catalytic effects. The electrodes may have these alloying components incorporated in iron or copper and copper/iron alloy base metals. In spite of the use of high-energy discharge, it has been found to be possible to keep the heating of the liquid at a minimum so that the reaction effectively takes place at ambient temperature or pressure.

As will be apparent hereinafter, spark-type discharges have the advantage that they not only provide the electromagnetic and the characteristics of sonic or supersonic transducers. Thus, for example, it has been found that sonic vibrations alone or in combination with some other high-energy or high-frequency activation, can activate the crude oil for the desulfurization reaction. An impulsive spark discharge within the liquid at a sonic frequency has the characteristics of an electroacoustical transducer inasmuch as it applies a shock wave to the liquid at the sonic frequency.

According to another aspect of this invention, the high-energy source is a laser which appears to activate the desulfurization reaction by photochemical means. The laser effect is indeed surprising in view of the fact that efforts to photochemically desulfurize crude oil have little effect when conventional techniques are employed. The laser may, moreover, be disposed within the liquid-containing vessel so that there is minimal loss of laser energy. Microwave energization of the liquid also has been found to be effective preferably in conjunction with one or more of the other modes of activation described herein.

Activation may, as indicated earlier, result from sonic or shock generators disposed in the liquid or in force-transmitting relationship therewith. Thus, for example, a spark discharge in the liquid itself may serve to generate shock or sonic waves, although it is also possible, according to this invention, to effect a spark-discharge in a relatively inelastic liquid separated from the liquid under treatment by a flexible membrane or the like. In my copending application Ser. No. 508,487 filed 18 Nov. 1965(now U.S. Pat. 3,512,384) as a continuation-in-part of my applications Ser. No. 41,080, Ser. No. 329,195, and Ser. No. 104,758 now U.S. Pat. Nos. 3,232,085, No. 3,232,086 and No. 3,208,254, I have described shock wave generators of this type. In such generators, one or a series of discharges may be effected in a liquid medium in a substantially closed chamber at least one wall of which is flexible or movable for transmitting the shock to some other medium. Other electrosonic transducers may, of course, also be employed. I have found that frequencies in the kilocycle and megacycle range (i.e., from 1 kc. to 100 mc./second and preferably from 50 kc./second to 10 mc./second) are most effective using transducers of this character. The transducer may be piezoelectric systems having vibratile elements immersed in the liquid for applying the vibrations thereto. Thus, magnetostrictive devices are significant for the purposes of the present invention.

In my copending applications Ser. No. 356,715 and Ser. No. 399,243, filed 2 Apr. 1964 and filed 25 Sept. 1964(now U.S. Pat. 3,330,746 and U.S. Pat. 3,446,718), respectively. I have already pointed out that high-energy sources with certain characteristic frequencies may be used effectively to reorient chemical bonds for synthesis or degradation under controlled conditions. As noted there, ultrasonic vibrations or electromagnetic activation of molecular species with radiant energy or vibration energy whose frequency is close to the resonance frequency of a molecular bond or is a near harmonic or subharmonic thereof, will effectively activate such a bond to synthesize different molecules or create other active species in the medium treated. The present invention, insofar as it relates to the use of these characteristic frequencies and the mechanical and electromagnetic activation of the sulfur-carbon or other chemical bonds in an extension of the principles originally set forth in these latter applications.

A further mode of facilitating the desulfurization of the liquid in combination with high-energy activation, as indicated above, is the generation of cavitation effects in the liquid circulating through the treatment vessel. These cavitation effects, produced by mechanical means or by collapse of an impulsive spark discharge or the like, appear to locally draw sulfur-containing gases out of the liquid and permit them to coalesce and emerge in the form of bubbles.

According to another aspect of the invention, the apparatus for treating crude oil or like petroleum liquids containing sulfur includes an elongated treatment chamber forming a free liquid surface to which a suction pump or the like can be applied for withdrawing the gases, as well as circulating means or fluid-displacing means for continuously passing the liquid through this chamber. The fluid-displacing means can be a remote pump or a blade device disposed at the treatment stretch so as to create a significant amount of turbulence as the liquid oil passes through the liquid zone and thereby at least partially induce the release of gaseous sulfur-containing compounds by cavitation. In accordance with this principle of the invention, a deflection plate or obstruction transverse to the direction of oil flow and preferably having an impinging surface larger than the flow diameter is interposed in the path of the liquid, preferably downstream from a high-energy desulfurizing means, for generating cavitation release of the gas along the downstream surface of the baffle. A similar baffle may be provided upstream of the desulfurizing means so as to create the turbulence which increases the efficiency of the desulfurizing action.

In accordance with a more specific feature of this invention, a pair of electrodes are juxtaposed in the liquid stream in this treatment chamber and are energized with a discharge energy of 50 to 1,000 joules per discharge at a rate of substantially 5 to 400 cycles per second. Under these circumstances, the impulsive character of the discharge and the cavitation produced by collapse of the expanding discharge region induces the rupture of the sulfur bond and reforms the sulfur into volatile gases.

According to a further feature of the invention, the high-energy activating means includes a laser surrounded by a pumping lamp. To this end, the vessel through which the fuel oil is circulated, may include a window exposed to the laser beam and transparent thereto, the laser being exposed externally to the vessel. It is, however, desirable to conserve the laser energy by disposing the laser directly within this vessel so that even indirect radiation of an effective wavelength performs a desulfurization function. Similarly, a microwave source can be disposed externally of the vessel with waveguides of appropriate character connecting the microwave cavity with the vessel through a window transparent to microwave energy.

Another feature of this aspect of the invention resides in disposing ultrasonic transducers along the walls of the vessel and energizing them via respective tuned circuits or other means for vibration at a number of characteristic frequencies constituting harmonics of or the principal resident frequency of the carbon sulfur bond under attack. In my copending applications Ser. No. 399,243 filed 25 Sept. 1964(now U.S. Pat. 3,446,718) and Ser. No. 356,715 of 2 Apr. 1964, (now U.S. Pat. 3,330,746), I have described how rupture of a chemical bond can be facilitated with little heating of the reaction mass when the frequency of vibration of the transducer is a harmonic or the principal characteristic frequency of the particular bond. All of this related disclosure is incorporated herein by reference. In more general terms, it can be said that the frequency of the ultrasonic transducers should be $f=(1.8/\epsilon) k \times 10^{12}$ cycles per second (c/s)

where $\epsilon$ is the dielectric constant and $k$ is the thermal conductivity of the molecule. When reference is made to integral harmonics, it is to be understood that the integral subharmonics frequently are effective for the present purposes.

I have also observed that desulfurization of the gas can be facilitated by the application thereacross of a high-frequency electrostatic field even though this field is of insufficient magnitude to produce a corona discharge or breakdown across the dielectric gap. To this end, a pair of electrodes are spaced apart in the vessel and extend parallel to the direction of liquid flow and are energized at the principal frequency $f$ indicated above or the sub- or superharmonics thereof.

Yet another feature of the apparatus aspect of the invention resides in the provision of impulsive-shock means within the vessel alone or in combination with the other high-energy sources described above. The shock-inducing means may include a liquid-containing receptacle having flexible walls and within which a spark discharge is developed as described in U.S. Pat. Nos. 3,232,085, No. 3,232,086 and No. 3,208,254, or copending application Ser. No. 508,487 mentioned earlier.

The above and other objects, features and advantages of the present invention will become more readily apparent from the following description reference being made to the accompanying drawing in which:

FIG. 4 is a circuit diagram of a system using electric discharge for the desulfurization;

FIG. 5 is a perspective view illustrating some ramifications of the system of FIG. 4;

Figure 1:
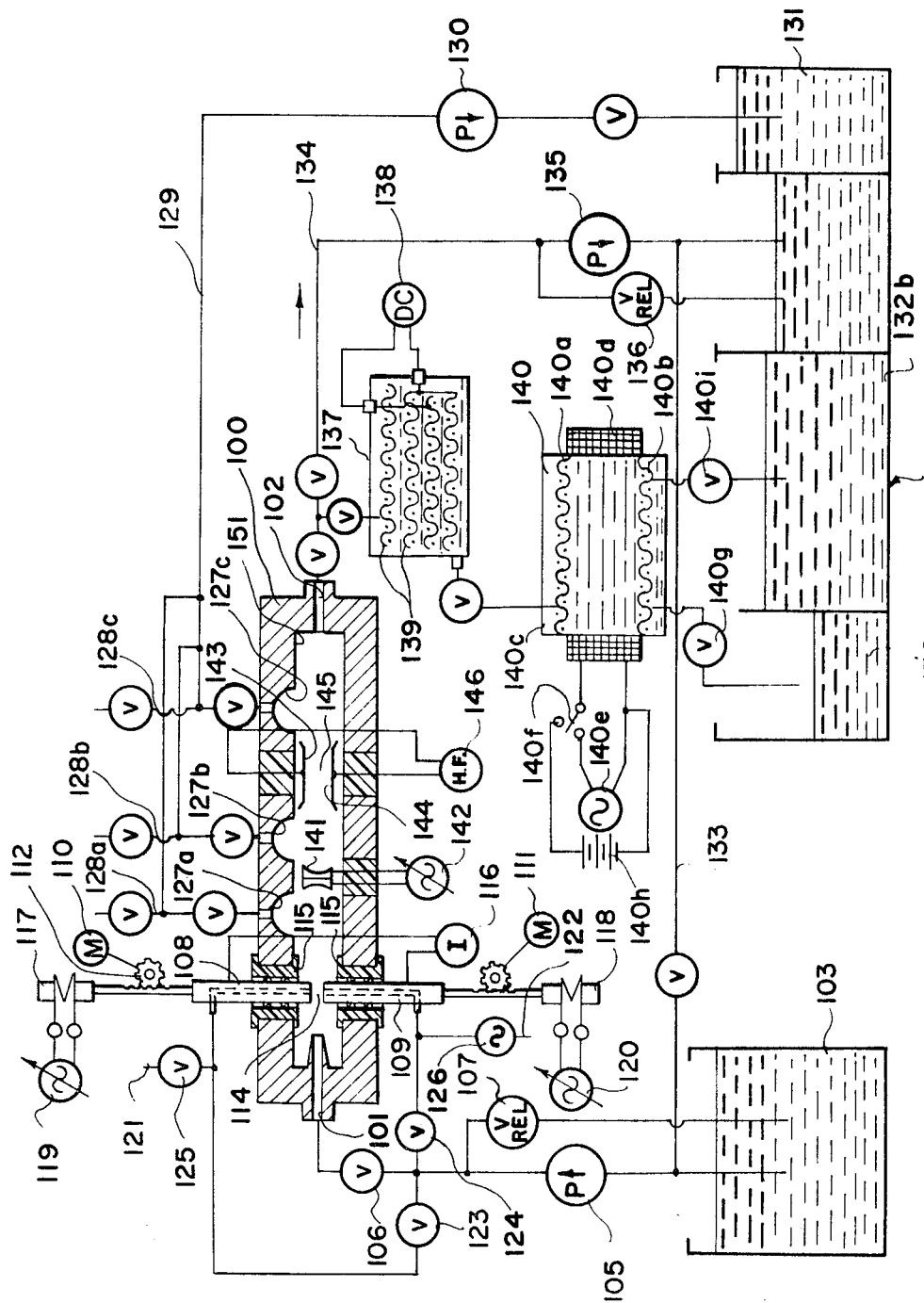
FIG. 1 is an axial cross-sectional view diagrammatically illustrating an apparatus for carrying out the present method in diagrammatic form.

In FIG. 1, I show a desulfurization vessel 100 having an inlet 101 and an outlet 102 at the opposite axial ends of this generally elongated vessel for the desulfurization of sulfur-containing crude oil. A continuous flow of crude oil is drawn from a tank 103 and delivered by a pump 105 and a valve 106 to the inlet 101, a pressure-release bypass valve 107 being connected in shunt across the pump 105 to return excess oil to the tank 103. The desulfurization reaction is here induced in part by spark discharge, in part by ultrasonic vibration and in part by a high-frequency electrostatic field as will become apparent hereinafter. It will be understood, however, that while it is preferred to use ultrasonic vibration and electrostatic field reversal concurrently with spark discharge, it is also possible to induce desulfurization without such joint action. At the first stage, the vessel 100 is provided with a pair of electrodes 108, 109 which may be tubular and can be composed of a catalytically effective substance as set forth in the specific examples below. Using motors 110 and 111, connected via rack-and-pinion drives 112 and 113 with the electrode 108 and 109, respectively, spark discharge at a substantially constant gap is effected across the gap 114 in spite of erosion of the electrodes. The electrodes 108 and 109 are guided for movement toward and away from one another in electrically insulating sleeves 115, while being energized by an impulsive-discharge source (e.g., a relaxation-type oscillator or charge-discharge capacitor) 116. Vibrations are imparted to the electrodes 108 and 109 in their major dimension via magnetostrictive cores 117, 118 whose coils, in turn, are energized by ultrasonic or sonic-frequency alternating current sources 119 and 120.

It has been found to be advantageous, if hydrogen sulfide is the most desired gaseous sulfur-containing component, to supply hydrogen to the region of the gap 114 although this is by no means essential. Hydrogen can be fed to the gap in the apparatus of FIG. 1 via hydrogen inlets 121 and 122 when the valves 123 and 124 of the oil supply line are closed. In the event it is desired not to deliver hydrogen to the gap 114, it is preferred, according to a feature of this invention, to feed the oil to be desulfurized as a coolant or to induce turbulence through the tubular electrode 108 and 109. For this purpose, valves 125 and 126 of the hydrogen-supply lines are closed and valves 123 and 124 are open. Valve 106 can be wholly or partially closed at the same time.

At a number of collection sources along the vessel 100, I provide collection domes 127a, 127b and 127c in which a gas pressure equal to that of the liquid pressure is sustained. In each of these domes 127a–127c, a free surface of the crude oil is exposed and sulfur-containing gases are evolved. These gases are withdrawn via simple lines 128a, 128b and 128c, respectively, when tests of the volume of evolution and composition of the extracted gas are desirable. Normally, however, the evolved gases are collected in a line 129 and conveyed via a pump 130 whose suction pressure determines the pressure in the domes, to a washing station 131, represented only diagrammatically but constituted by any conventional scrubbing-tower, condenser arrangement or the like capable of removing the noxious sulfur-containing substances. When absorption columns are employed for this purpose, the sulfur-containing components can be recovered.

When it is desired to continuously circulate the crude oil, as is the case with crude-oil treatment upon tankers or the like, in which, for example, the receptacle 103 may represent one of the bulk tanks of a ship and tanks 132 represent other bulk tanks in which crude oil of various degrees of purification are collected, a line 133 is provided between the outlet line 134 and the inlet side of pump 105. A further pump 135 and a respective relief valve 136 are used when reversal of the flow direction is desired. It has been found to be highly advantageous to pass the oil through a conventional electrostatic filter as represented at 137 which is energized with a high-voltage DC current from a source 138. The oppositely charged screens 139 collect particulate materials as the liquid flows therethrough. It has also been found to be desirable to provide a magnetic filter 140 in the outlet line, such filter being of the type described and claimed in my copending application Ser. No. 598,512, filed 1 Dec. 1966.

In this type of filter, a mass of permanently magnetic or magnetically permeable particles is received between a pair of screens 140a and 140b and tend to coalesce under the interparticle magnetic forces to form relatively constricted passages. The vessel 140c is surrounded by a magnetic coil 140d which may be energized by an AC source 140e via a switch 140f. When so energized, the coil 140d applies a rapidly alternating field to the particles and thus dislodges connected material. Concurrently with the energization of coil 140d by the source 140e, valve 140g is open to collect contaminated fuel in the compartment 132a. While, when the alternating magnetic field is terminated or a DC magnetic field from battery 140h is applied to the coil 140d to reconstruct the passages, the valve 140i is open and purified crude oil is collected in compartment 132b of the tank 132.

Downstream of the spark at 114, I provide a magnetostrictive electrosonic transducer 141 adapted to apply high-frequency vibrations to the liquid within the vessel 100. The magnetostrictive vibrator 141 is energized by a high-frequency oscillator 142. Further downstream, a pair of electrodes 143 and 144 are juxtaposed with a relatively wide gap 145 and extend parallel to the direction of flow of the oil. A high-frequency high-voltage oscillator 146, capable of generating high-power radiofrequency waves, is connected across the plates 143 and 144 so that a high-frequency field is applied in the kc or mc. range across the dielectric liquid.

In operation, a crude oil may be delivered to the tanks 103 of a transport vessel such as a seagoing tanker and transported to a location remote from the source for refining and distribution. Alternatively, refining may be carried out at the source of the crude oil and a heavy oil containing considerable sulfur may be transported by the vessel. In either case, during the transportation of the crude oil, the oil is circulated by a pump 105, the desulfurization chamber 100 and the line 133 through the compartment 141 along a plurality of successive treatment zones. In the first treatment zone, a spark discharge is effected between the aluminum, copper or iron electrodes 108, 109 containing tungsten, molybdenum, titanium, vanadium, cadmium, chromium or zinc alloying metals in catalytically effective amounts.

Spark repetition frequencies in the kilocycle or megacycle per second range are carried out. The vibration imparted to the electrodes 108 and 109 may be at the same frequency as the discharge source 116 or at a different frequency (preferably 5 to 400 cycles per second) as induced by the vibrators 117, 119 and 118, 120. The evolved sulfur-containing gases, primarily hydrogen sulfide and carbon disulfide, are collected in the dome 127a along with quantities of hydrogen, methane and alkanes having carbon numbers up to about 6. The gaseous hydrocarbons can be separated by condensation at 131 and the sulfur-containing gases collected by absorption and converted to useful products or discarded.

The oil then is activated by the magnetostrictive vibrator 141 with sonic or ultrasonic frequencies, the released gases being collected in zone 127b and being treated or separated in the manner described.

Finally, the crude oil passes through a high-frequency treatment zone between the plates 143 and 144 where radiofrequency activation with corona discharge or without such discharge releases further quantities of the sulfur-containing gas. After passage of the oil several times through the treatment vessel, it is found that the major part of the sulfur is removed and the thus purified oil is passed through the electrostatic filter 137 (at which electrically charged or polar substances are removed) and then through the magnetic filter 140 which traps minute particles. The purified crude oil is collected in compartment 132b.

Figure 2:
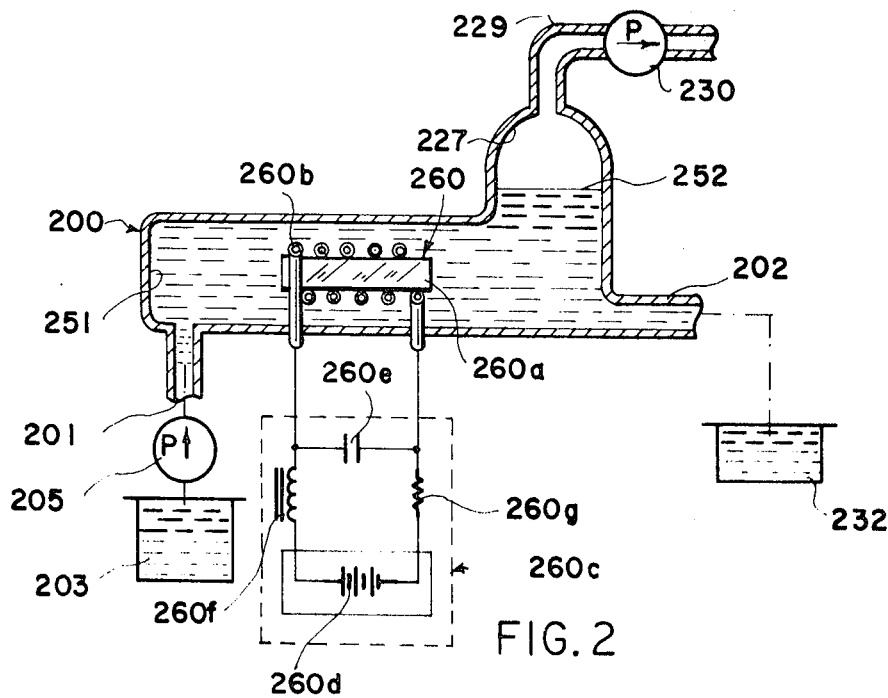
FIG. 2 is an axial cross-sectional view of another apparatus according to this invention making use of laser energy.

In FIG. 2, I show a modified system for the desulfurization of a crude or semirefined oil adapted to be used on shipboard, in a preliminary treatment stage of an oil refinery or between the oil well and the storage tank in an oil-producing field. In this embodiment, the treatment vessel 200 is supplied with the crude oil at its inlet 201 by a pump 205 from a crude oil source 203; the latter may be a tank of the oil-transporting vessel, the well or a storage tank at a refinery. The vessel 200 forms a treatment chamber 251 in which a high-energy and high-frequency source represented at 260, is disposed. The high-energy source here includes a laser crystal 260a e.g., of the ruby or aluminum-oxide type), surrounded by a number of turns of the pumping lamp 260b. The pumping lamp is a xenon tube which is pumped by a pulse source 260c represented diagrammatically. The pumping source can, therefore, include a battery or other direct current source 260d connected across a discharge capacitor 260e in series with a surge-suppressing choke 260f and a charging resistor 260g. The laser 260a is pumped at a rate of approximately two cycles per second although higher pumping frequencies are also suitable. The vessel 200, moreover, has a dome 227 in which a free surface 252 of the liquid is maintained, the evolved gases being collected in this dome and being conducted away via a line 229 and a suction pump 230. The treated oil emerges from the vessel 200 at an outlet 202 and is collected in a tank 232. The tank 232 may, therefore, represent another tank aboard the tanker, at the refinery, or at the oil field.

Figure 3:
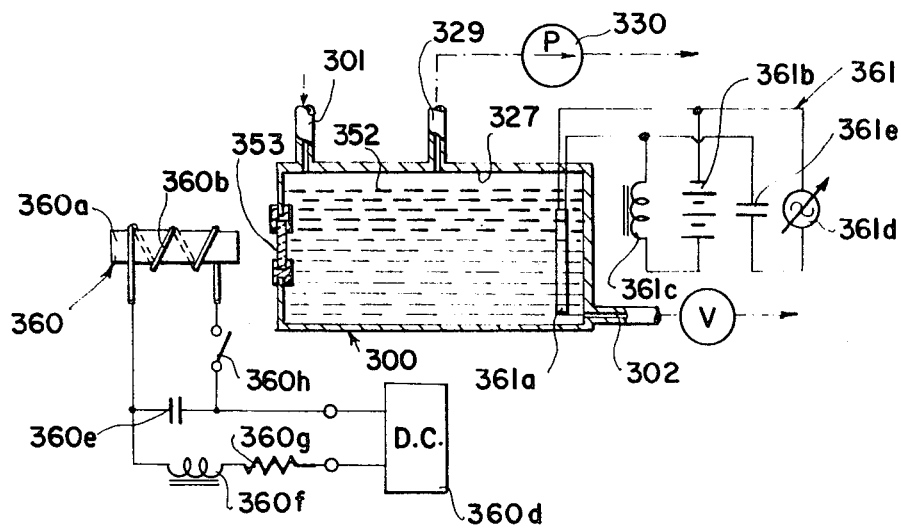
FIG. 3 is another diagram in cross section along a vertical plane showing the use of a laser for the desulfurization of the fuel oil.

In FIG. 3, there is shown another laser —activated system for the desulfurization of crude oil according to my invention. In this system, the vessel 300 is provided with a window 353 transparent to the laser radiation and juxtaposed with a laser system 360. The latter includes the laser crystal 360a and the xenon pumping lamp 360b which is connected, via a switch 360h, across a discharge capacitor 360e. The latter, in turn, is energized by a DC source 360d in series with a surge-suppressing inductance 360f and a charging resistor 360g. The crude oil is supplied to the vessel 300 by an inlet 301 and is removed at an outlet 302; the crude oil is circulated and displaced and stored via tanks and a circulating system as described in FIGS. 1 and 2.

The upper portion of the vessel 300 forms a hood 327 into which the gases are evolved above the free surface 352 of the crude oil. The gases are drawn from the device via an outlet 329 and a suction pump 330 for treatment in the manner previously described.

I have found it to be highly advantageous to combine the laser activation of FIGS. 2 and 3 with a sonic or ultrasonic mechanical fabrication produced with the aid of an ultrasonic vibrator emerged in the liquid of the vessel. While such an arrangement is illustrated with respect to FIG. 3, it is, of course, also applicable in the system of FIG. 2. The ultrasonic system 361 (FIG. 3) includes a transducer 361a whose frequency may be the resonant frequency of the sulfur-carbon bond under attack in the system or an integral harmonic or subharmonic thereof. At any rate, frequencies in the kilocycle and the megacycle range are preferred. The ultrasonic transducer 361a may be of the magnetostrictive type and is biased by a DC source 361b in series with a choke 361c. The vibrations are determined by a variable frequency oscillator or alternating current source 361d connected across the transducer 361a via a DC blocking capacitor 361e.

The spark means illustrated in FIG. 1 for inducing the desulfurization of the crude oil adapted to be used in conjunction with the lasers in FIGS. 2 and 3 can be constituted as illustrated generally in FIG. 4. Here, four pairs of juxtaposed electrodes 408a, 409a; 408b, 409b; 408c, 409c; and 408d, 409d are spaced along the vessel 400 in the direction of flow of the oil. I have found that, instead of vibrating the individual electrodes, turbulence may be induced and mechanical activation of the oil promoted by the vibration of an intermediate electrode which is reciprocated transversely to the main electrodes. Such vibration or reciprocation has a further advantage that it permits impulsive spark discharge between itself and each of the main electrodes of each pair while preventing the formation of continuous discharges. To this end, the intermediate electrode 454 is formed by a metal (e.g., iron) plate parallel to the duration of flow of the oil (arrows 455). The plate 454 is guided (by means not shown) in the vessel 400 between the electrodes of each pair and is common to these electrodes while having an armature 454a biased by a tension spring 454b to the left and periodically attracted to an electrode aligned at 454c whose coil 454d is energized by a variable-frequency AC source 454e. A particularly advantageous oscillation rate for the plate 454 is 50 to 120 cycles per second.

This system has also a further advantage in that each of the electrode pairs may sustain a respective spark-discharge frequency designed to activate several types of chemical bonds and promote the breakage or formation of such bonds. In this case, four frequencies may be used although eight are possible when the individual electrodes are energized, against the intermediate electrode, with different parameters.

The energization circuit here includes a three-phase alternating current source 416 which supplies a three-phase isolation transformer 416a and a three-phase rectifier network 416b. The positive terminal of this network energizes, via circuit-suppressing chokes 416c and 416d, the capacitors 416e respectively assigned to the electrodes 408a through 408d to effect discharges between each of these electrodes and the plate 454. A similar set of chokes 416f and 416g is connected in circuit with the capacitors 416h between the intermediate electrode 454 and the electrodes 409a through 409d. Depending, of course, upon the parameters of these circuits (e.g., the respective capacitances), a predetermined discharge rate will be sustained between each electrode and the movable plate 454 to promote desulfurization.

FIG. 5 shows a modification of this system wherein the electrodes 508a and 509a, for example, are tubular and supplied with crude oil through their interior, the oil emerging as a gap 514a and 514b, respectively, in a relatively thin film along the intermediate electrode 554. The latter can, if cylindrical, be rotated or may be reciprocated as represented by arrow 555 by the means illustrated in FIG. 4. The use of the intermediate electrode not only insures the necessary agitation of the crude oil but also maintains the activated film of oil at a minimum. I have found that the most effective spark activation of the crude oil takes place when the spark passes through relatively thin films thereof.

Figure 7:
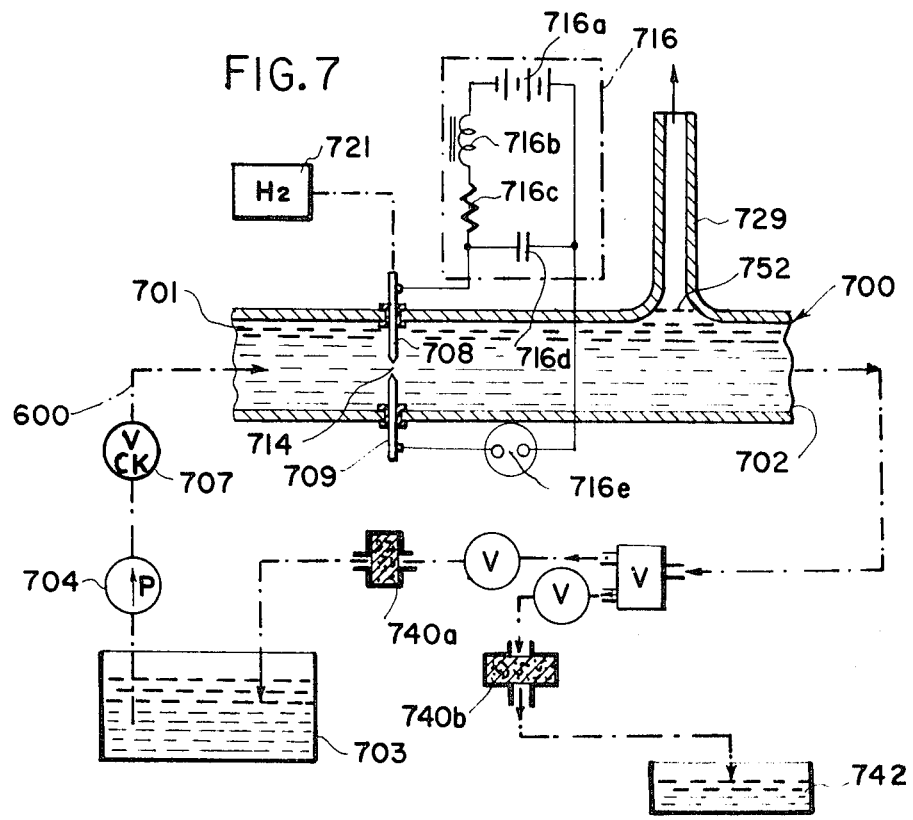
FIG. 7 is a similar view of another system making use of cavitation phenomena.
Figure 6:
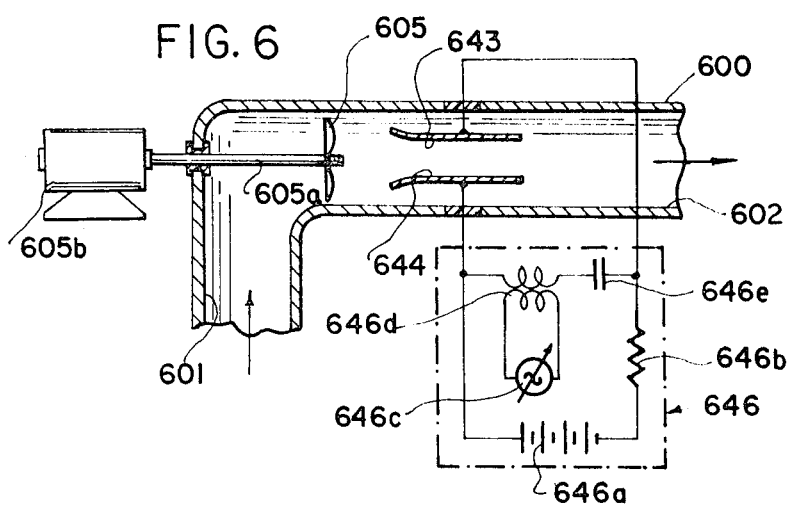
FIG. 6 is an axial cross-sectional view of a system using cavitation effects in conjunction with high-voltage fields for the removal of sulfur from crude oil.

In FIG. 6, I show still another means for promoting desulfurization of the crude oil, it being understood that the device here illustrated may be used to feed the crude oil to any of the systems described with reference to FIGS. 1 through 5. Thus the vessel 600 is constituted as a duct whose outlet side 602 can be connected to a reservoir for the treated oil or to one of the treatment vessels 100–400 previously described. The inlet 601 is formed as an elbow of the pipe and can be connected with a source of the oil such as a tank, pipeline or the like. In this embodiment, the displacement of the crude oil is effected by a high-speed propeller 605 which simultaneously produces turbulence upstream of a pair of electrodes 643 and 644 across which a high-frequency (e.g., radiofrequency) field is applied. The propeller blade 605 is driven by a shaft 605a of a high-speed motor 605b capable of producing in the oil stream cavitation phenomena which appear to promote desulfurization. The turbulence, moreover, appearing between the plates 643 and 644, increases the effectiveness of the high-frequency field in desulfurization. The plates 643, 644 are energized by a high-frequency source 646 with a direct current bias; this source may include a battery 646a connected across the plates 643, 644 so as to apply electrostatic potential thereto. The resistor 646b can represent high-frequency oscillator 646c is coupled, via a transformer 646d, across the plate 643, 644, via a DC blocking capacitor 646e. The oil emerging at 602 can also be subjected to spark discharge removal of sulfur by feeding it directly into the device illustrated in FIG. 7 or into the latter via a cavitation-promoting device of the type illustrated in FIG. 8. For the present purpose, therefore, the system of FIG. 6 may be considered suitable alone or as the inlet means for the treatment vessel 700 of FIG. 7.

The inlet side 701 of this vessel can be provided with the inlet system of FIG. 6 as represented diagrammatically at 600', a check valve 707 and a circulating pump 704 being included in this inlet means or attached thereto for delivering oil from a tank 703 to the vessel 700. The outlet 702 of the treatment chamber delivers the oil via a filter 740a to the tank 703 for the circulatory desulfurization of the oil to progressively decrease the sulfur contents. When the sulfur content is sufficiently diminished, the oil is diverted to the filter 740b and a collection tank 742 for the purified curde. An exhaust line 729 recovers hydrogen sulfide, carbon dioxide, sulfur dioxide and carbon disulfide above the free surface 752 of the oil together with some volatile hydrocarbons as previously described. The desulfurization reaction is here promoted by a spark discharge across a gap 714 to produce an impulsive force or shock wave followed by a collapse of the shock field and cavitation. To this end, the spark-discharge source 716, connected across the tubular electrodes 708 and 709, includes a DC supply 716a in series with a surge-suppressing choke 715b and a charging resistor 716c across the discharge capacitor 716d. Discharge energies of 50 to 1000 joules per discharge are applied at a discharge frequency of 5 to 400 cycles per second when the impulse/cavitation effect is desired. To promote the explosive force of the discharge and increase the rate at which the sulfur is combined with hydrogen, molecular hydrogen is fed into the pointed electrode 708 from the supply tank 721. The hydrogen-gas jet in the spark gap 714 thus increases the explosive force. The discharge rate is, of course, controlled by the breakdown frequency of a spark gap 716e in a series with the electrodes.

Figure 8:
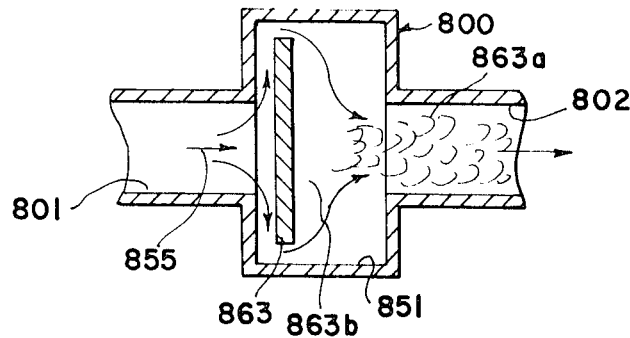
FIG. 8 is an axial cross-sectional view of a cavitation inducing means adapted to be employed with the system of FIG. 7.

As previously indicated, cavitation can be promoted by disposing the device of FIG. 8 in the crude oil path of the circulating or pumping system in any of the devices of FIGS. 1 through 7. Thus the vessel 800 in FIG. 8 can be disposed downstream of a gas-generating means adapted to remove sulfur from the crude oil and connected thereto at the outlet 802 of the cavitation device illustrated in FIG. 8. The crude oil is pumped into the inlet 801 of this device in a laminar flow and emerges into a chamber 851 whose diameter map be more double that of the inlet 801. Just beyond the mouth of the latter, I provide a baffle 863 whose surface area transverse to the direction of flow of the oil (arrow 855) is greater than the cross section of the inlet 801. The oil thus flows around the periphery of this baffle 863 which appears to promote substantial turbulence at 863a as well as a cavitation space 863b on the downstream side of the baffle 863. Such baffle may, of course, be provided directly within the vessels 100 through 400, 600, 700 and 1000 of FIGS. 1 through 4, 6, 7 and 10, respectively.

Figure 9:
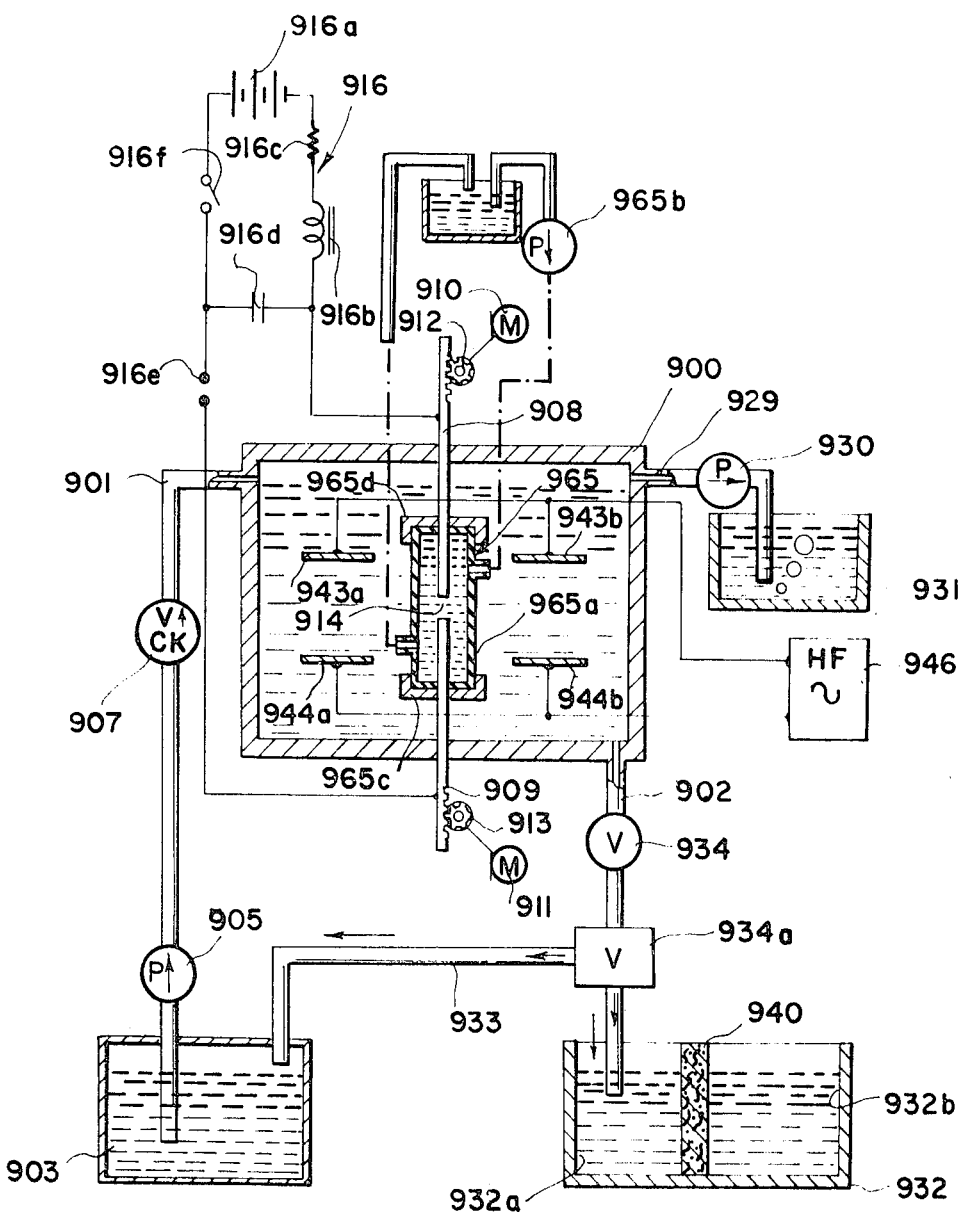
FIG. 9 is a vertical cross-sectional view through yet another apparatus operating in accordance with the principles of this invention and making use of shock waves to induce the desulfurization reaction.

In FIG. 9, I show another system for removing sulfur from crude oil on shipboard or elsewhere with the aid of shock energy. This system comprises a treatment vessel 900 whose inlet 901 includes a pump 905 and a check valve 907 adapted to draw the crude from a tank 903. Above the free surface 952 of the crude oil of the vessel 900, the evolved gases are collected and recovered via an exhaust duct 929 and a suction pump 930 for subsequent treatment and/or collection as represented at 931. The outlet 902 for the oil includes a valved duct 934 which feeds a distributing valve 934a for selectively diverting the oil to the recirculation duct 933 or to a collection chamber 932a of a further tank 932. A filter 940 is disposed between the compartment 932a and a compartment 932b from which filtered and treated oil is removed. The shock wave generator 965 of this embodiment can be constituted as illustrated and described in my U.S. Pat. Nos. 3,232,085, No. 3,232,086 and No. 3,208,259 and in my copending application Ser. No. 508,487(now U.S. Pat. 3,512,384) and includes a flexible wall cylinder 965a, in which a pair of electrodes 908 and 909 are juxtaposed. A force-transmitting liquid medium, e.g., transformer oil or kerosene, is circulated through the receptacle 965a by a pump 965b to carry away any eroded portion of the electrode material and maintain a substantially invariable dielectric constant across the gap. Using the servo means of these latter patents and application, as represented by the motors 910, 911 and the rack-and-pinion transmissions 912, 913, a constant spark gap 914 is maintained between the electrodes. The vessel 965a is held between the rigid brackets 965c and 965d within the vessel 900. The electrodes 908 and 909 are energized by the impulse source 916 which includes the battery 916a, a surge suppressing choke 916b, the charging resistor 916c and a discharge capacitor 916d. A spark gap 916e is provided for timing the discharges and may also represent a breakdown-type switch which triggers the discharge electronically, should such a device be desired. A further switch 916f serves to interrupt the charging circuit so as to deenergize the electrodes. I have found that the shock wave generated within the vessel 965a and transmitted to the crude oil via the flexible walls of the latter may effectively be combined with high-frequency energization to promote the desulfurization. For this purpose, electrode pairs 943a, 944a and 943b, 944b are disposed on opposite sides of the shock wave generator 955 and are connected to a radiofrequency source represented at 946 and having the circuit characteristics of the high-frequency source 646 of FIG. 6.

Figures 10A, 10B:
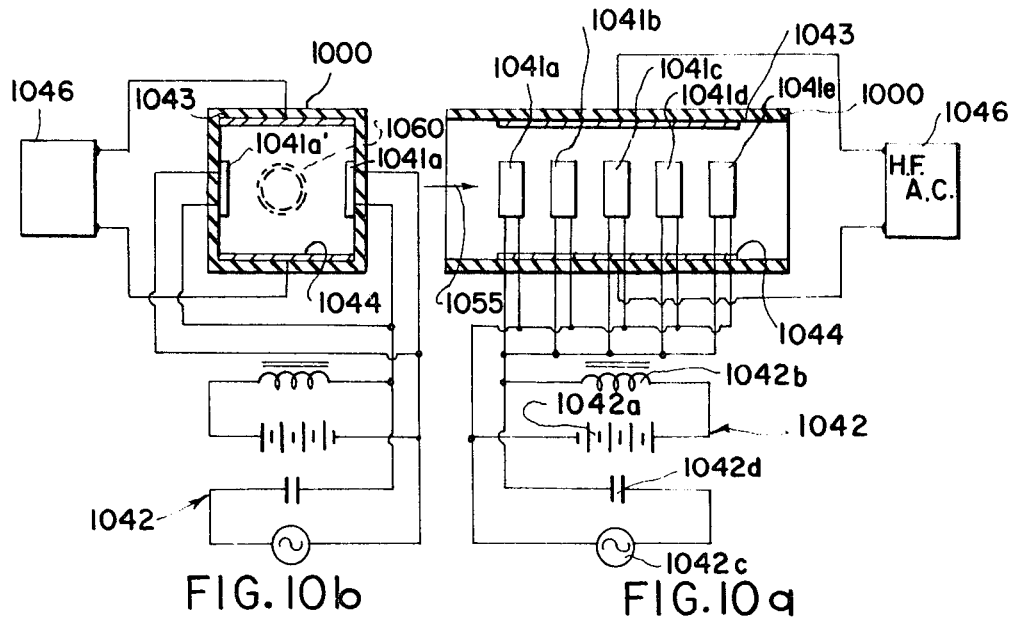
FIGS. 10a and 10b are cross-sectional views through another treatment vessel in accordance with this invention.

In FIG. 10 whose views FIG. 10a and FIG. 10b are respectively longitudinal and transverse vertical sections, the desulfurization vessel 1000 receives a stream of crude oil in the direction of arrow 1055 via a circulating means or pumping means of the type illustrated in FIG. 1. In this system, however, desulfurization is carried out by vibrational energy in combination with high-frequency electrostatic fields and, possibly, in conjunction with laser activation. Thus, a pair of plates 1043 and 1044 are spaced apart on opposite sides of the vessel, which may be composed of an electrically insulating material such as rubber or plastic, and extend in the flow direction 1055. A high-frequency alternating current field is applied across the plates 1043, 1044 by a power supply 1046 whose circuit may be similar to the power supply illustrated at 646 in FIG. 6 and include a high-voltage DC source together with a radiofrequency generator transformer-coupled across the plates. A Xenon-pumped laser may be disposed in the vessel as represented at 1060 in FIG. 10b, the pumping circuit and laser arrangement being constituted as illustrated in and described in connection with FIG. 2.

Along the lateral walls of the vessel 1000, I provide a plurality of individual electroacoustical ultrasonic transducers or vibrators 1041a, 1041b, 1041c, 1041d and 1041e along one side of the vessel, and 1041a' etc. along the opposite side. Each of these transducers has a characteristic frequency differing from the others so that the transducer frequencies correspond substantially to all of the principal resonance frequencies, harmonics or subharmonics of the molecular bonds which are to be affected. The tranducers may be energized by respective high-frequency sources although, for the purposes of illustration, a single source is provided for all of these transducers. The ultrasonic vibrator source 1042 includes the biasing battery 1042a in series with a surge-suppressing choke 1042b across the transducers 1041a etc., while a high-frequency alternating-current source 1042c is connected in series with a DC blocking condenser or coupling condenser 1042d across the biasing source and the transducers.

Downstream of the transducers, a free-liquid surface is provided with suction means as previously described for collection and withdrawal of the evolved sulfur-containing gases.

EXAMPLE I

Using the apparatus illustrated in FIG. 2, 5 liters per minute of Kafuji crude oil is passed through the vessel 200 which contains a laser crystal of the $Cr/Al_2O_3$ - type with a diameter of 10 mm. and a length of 75 mm. The crystal has a characteristic laser emission of 6,794 A. and is pumped with 10,000 joules pulses using several turns of a helicoidal xenon lamp surrounding the crystal and operated at 2 cycles/sec. 30 liters of the crude oil are treated in a period of 30 minutes and the original sulfur content of 3.6 percent is reduced to 2.1 percent by weight, a diminuation of the sulfur content of 43 percent. There was substantially no temperature rise above ambient.

EXAMPLE II

A heavy fuel oil from a refinery containing 3 percent by weight sulfur was treated in the apparatus illustrated in FIG. 9.

The shock generator 965 was filled with kerosene with continuous circulation and a single discharge of an energy of 7,000 joules was carried out between aluminum electrodes containing 2 percent by weight vanadium. 55 cc. of the heavy oil were thus treated and 22 cc. of hydrogen sulfide were evolved together with traces of carbon disulfide, sulfur dioxide and carbon dioxide. Analysis showed that the sulfur content was reduced by about 1/3, to a maximum of 2 percent by weight.

EXAMPLE III

Using again the system of FIG. 9 and the impulsive source of example II, desulfurization was promoted by high-frequency energization of the electrodes 943a, 944a, and 943b, 944b. Each of the electrodes was rectangular with confronting dimensions of 2×2 mm. and interelectrode gaps of 10 mm. A peak potential of 1,200 volts and of a square- wave form at 1,000 kc./sec. was applied between the electrodes and a corona discharge was observed. Analysis in the same treatment time showed that 2.25 percent by weight of sulfur was removed, a net removal of approximately 75 percent of the original sulfur. When the impulses of the shock generator 965 and the field of the electrodes 943a, 944a; 943a, 944b are applied separately, the total sulfur removal is less than that obtained when both types of activation are carried out simultaneously. The synergistic results have not been fully understood.

EXAMPLE IV

Using a system of the type illustrated in FIG. 1, a crude oil containing 2.5 to 3.0 percent by weight of sulfur was processed at a flow rate of 7 to 8 liters/minute, the vessel 100 having a length of about 150 mm. and a generally rectangular cross section of 40×50 mm. The electrodes 108 and 109 had a diameter of about 2.5 mm. and were composed of copper.

With a mean voltage of 40 volts, a mean current of 5 amp. and a spark repetition frequency of 100 kc./second, 900 to 1,600 cc./minute of gas was evolved, the gas containing 1.2 percent hydrogen sulfide, 45.5 percent alkanes (represented as $C_6H_{14}$), 25 percent hydrogen and 11 percent methane. At 35 volts (mean voltage) and 4 amp. mean current at 105 kc./second repetition frequency, 800 to 1,400 cc./minute of gas were evolved containing 3.2 percent hydrogen sulfide. At approximately 1 mc./second, a mean voltage of 50 v., a mean current of 3 amperes, and a gas evolution rate of 350 cc./minute, a somewhat lower hydrogen sulfide proportion was obtained. As a rule, maximum efficiency was found with spark repetition frequencies between 80 kc./second and 1 mc./second.

EXAMPLE V

The apparatus of FIG. 1 was employed to determine the catalytic effect of the electrode material upon the gas-evolution rate and the proportion of hydrogen sulfide contained within the evolved gases. The vessel having the dimensions given in example IV was employed with five pairs of spaced-apart electrodes (electrode diameter and flow rate as given in example IV) with a mean current of 5 amp. and a mean voltage of 46 volts. The crude oil, originally at a temperature of about 50° C. showed no increase in temperature. Using spark discharge at about 100 kc./second, the copper electrodes produced 2,800 cc./minute of gas and 0.2 percent $H_2S$ therein. When the electrodes were replaced by catalytically effective electrodes of the following six compositions, the gas evolution rate was raised to 3,100 cc./minute and the $H_2S$ proportion to 4.6 percent. By contrast, the use of electrodes of the same base metal as those of the catalyzed electrodes but without the catlytically effective oxide produced 3,310 cc./minute of gas with, however, a hydrogen sulfide content of only 0.8 percent. With an iron/iron-oxide catalyzed electrode serving as the positive electrode in each of the pairs and catalyzed copper, aluminum, nickel, chromium and zinc electrodes serving as the negative electrode of each of the five pairs, the gas evolution rate became 2,500 cc./minute and the $H_2S$ proportion increased to 5.5 percent.

Catalyzed electrodes

| Aluminum | 5% by weight | $Al_2O_3$, | balance aluminum |
|---|---|---|---|
| Nickel | 3% by weight | NiO | balance nickel |
| Chromium | 5% by weight | $Cr_2O_3$ | balance chromium |
| Copper | 3.5% by weight | $Cu_2O$ | balance copper |
| Zinc | 3% by weight | ZnO | balance zinc |
| Iron 2% by weight | | $Fe_2O_3$ | balance iron |

When tungsten, molybdenum and titanium were incorporated in these base metals or in the corresponding metals as the oxides, similar catalytic results were obtained. In fact, excellent results were achieved with 2 percent by weight vanadium oxide in aluminum, copper or iron.

EXAMPLE VI

Figure 11A:
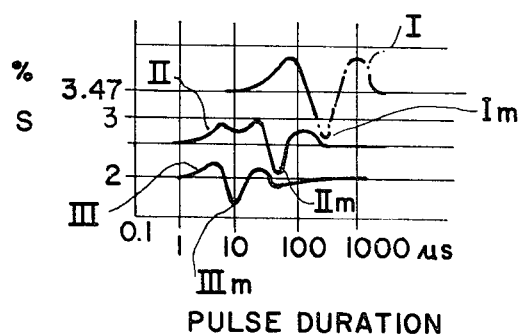
FIGS. 11a and 11b are graphs illustrative of the invention.
Figure 11B:
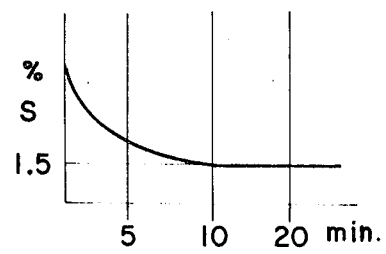

Desulfurization was carried out upon 5 liters of Kafuji crude oil containing 3.7 percent by weight sulfur using the electrode setup of example IV. During each run, a mean voltage of 50 volts and a means current of 3 amperes was employed with electrodes of 2.5 mm. in diameter. The graph of FIG. 11a illustrates three successive runs and the desulfurization characteristic of each run. It was discovered that, when the sulfur content is plotted against the pulse duration of the discharge (see curve I), the sulfur content initially rises slightly, then falls sharply to a minimum $I_m$ and then again comes to a peak. The increase in sulfur content appears to be a consequence of the recombination of released or free sulfur into chemically bonded sulfur. Consequently, in this example, the pulse duration was gradually increased until the minimum $I_m$ was attained at approximately 200 microseconds. At this point, the discharge was cut off and the pulse duration reset at about 20 microseconds corresponding to the trough $II_m$ of the curve II of the second run. During the second run, the sulfur content initially was about 2.4 percent by weight and was reduced to approximately 2 percent by weight. The third run was carried out with a pulse duration of the energization circuit of somewhat less than 10 microseconds ($III_m$) during the third run (graph III) and terminated when the sulfur content fell to about 1.5 percent by weight. As shown by the graph of FIG. 11b, at each run the sulfur content leveled off after about 10 minutes of treatment time. Thus each run was continued for about 10 minutes and the total treatment time was 30 minutes for the three runs. It was found that ultrasonic vibrations, at about 460 kc./second, using the system illustrated in FIGS. 10a and 10b with electrosonic energies of 15 watts/cm. of transducer surface, effectively reduced the sulfur content of 3 percent sulfur crude oil to 2 percent by weight. When ultrasonic radiation of this frequency was employed in the system of FIG. 1 (Examples IV –VI), the increased rate of sulfur removal and the degree of sulfur removal exceeded substantially the total which would be expected from spark discharge and ultrasonic vibration alone.

The invention described and illustrated is believed to admit of many modifications within the ability of persons skilled in the art, all such modifications being considered within the spirit and scope of the appended claims.

I claim:

1. A method of desulfurizing a petroleum liquid such as a crude oil or a fuel oil containing organic molecules having at least some chemically bound sulfur, comprising the steps of subjecting the catalyst-free liquid to wave energy in the range of kilocycles/second to megacycles/second without substantial increase of the temperature of said liquid and of a frequency, intensity and duration capable of releasing at least part of the chemically bound sulfur from said liquid by converting it to sulfur-containing gases, and separating the sulfur-containing gases thus formed from said liquid, said wave energy being derived from at least one energy source from the class of spark discharge, shock wave mechanical vibration, laser and microwave sources.

2. The method defined in claim 1 wherein said liquid is passed continuously through a treatment chamber in which the liquid is subjected to said wave energy and the separation of said sulfur-containing gases is effected at least in part by applying a reduced pressure to said liquid and collecting sulfur-containing gases above a free surface of the liquid upon its subjection to said wave energy.

3. The method defined in claim 1 wherein said liquid is continuously recirculated through said chamber until the sulfur content of said liquid drops below a predetermined level.

4. The method defined in claim 3, further comprising the step of inducing the release of sulfur-containing gases from said liquid during the continuous displacement of said liquid by creating cavitation in the moving liquid.

5. The method defined in claim 3 wherein said wave energy is at least partially produced by subjecting the liquid to a laser beam of a wavelength adapted to activate the separation of sulfur from said liquid.

6. The method defined in claim 5, comprising the step of immersing a laser in said liquid to subject the latter to said beam.

7. The method defined in claim 3 wherein said wave energy is at least in part produced by effecting an electric discharge in said liquid.

8. The method defined in claim 7 wherein said electric discharge is an impulsive spark discharge generated periodically across a pair of spaced-apart electrodes at a frequency in the kc./sec. and mc./second range.

9. The method defined in claim 8, further comprising the step of catalyzing the release of sulfur from said liquid by contacting it with a catalytically effective quantity of a substance selected from the group which consists of tungsten, molybdenum, titanium, vanadium, cadmium, chromium or zinc and oxides or salts thereof and incorporated in at least one of said electrodes.

10. The method defined in claim 3 wherein said wave energy is applied to said liquid in part by passing same between a pair of spaced-apart plates and applying a relatively high periodic electrostatic potential across said plates at a frequency in the kilocycle or megacycle range.

11. The method defined in claim 3 wherein said wave energy is applied to said liquid at least in part by subjecting same to a shock wave from a shock-wave generator immersed in said liquid.

12. The method defined in claim 11 wherein said shock wave generator includes a vessel filled with a force-transmitting liquid and separated from the sulfur-containing liquid by a flexible wall, further comprising the step of generating an electric discharge in the liquid within said vessel to generate the shock wave.

13. The method defined in claim 3 wherein said wave energy is applied to said liquid at least in part by immersing in said liquid an electroacoustical transducer, further comprising the step of energizing said transducer at sonic or ultrasonic frequency capable of promoting the release of sulfur from said liquid.

14. A method of desulfurizing crude oil or fuel oil containing molecules having at least some chemically bound sulfur, comprising the steps of circulating the oil continuously through a treatment zone, in the form of a catalyst-free liquid at ambient temperature; subjecting said liquid in said zone to at least one of the following forms of wave energy of a frequency, intensity and duration sufficient to release at least part of the chemically bound sulfur from said liquid, thereby converting the released sulfur to sulfur-containing gases, said forms of wave energy consisting of laser energy, vibratile and shock wave energy of a frequency in the range of kilocycles or megacycles/ second and electromagnetic energy in the range of kilocycles and megacycles/second; collecting above the liquid in said zone the sulfur-containing gases released from said liquid; and evacuating said sulfur-containing gases from said zone.

* * * * *

UNITED STATES PATENT OFFICE
CERTIFICATE OF CORRECTION

Patent No. __3,616,375__  Dated __14 March 1972__

Inventor(s) __Kiyoshi INOUE__

It is certified that error appears in the above-identified patent and that said Letters Patent are hereby corrected as shown below:

<u>Claim 1</u>, penultimate line (col.13, line 2) should read:

-- discharge, shock wave , mechanical vibration, laser and -- ;

<u>Claim 8</u>, last line (col.13, line 31) for "and" read -- to -- ;

<u>Claim 14</u>, line 13 (col.14, line 34) for "and" read -- or -- ;

Signed and sealed this 28th day of November 1972.

(SEAL)
Attest:

EDWARD M. FLETCHER, JR.
Attesting Officer

ROBERT GOTTSCHALK
Commissioner of Patents